United States Patent [19]

Lee et al.

[11] Patent Number: 5,706,263
[45] Date of Patent: Jan. 6, 1998

[54] METHOD AND APPARATUS FOR HIGH-DENSITY REPRODUCTION

[75] Inventors: Chul-woo Lee; Kyung-hwa Rim, both of Seoul, Rep. of Korea

[73] Assignee: Samsung Electronics Co., Ltd., Kyungki-do, Rep. of Korea

[21] Appl. No.: 364,984

[22] Filed: Dec. 28, 1994

[30] Foreign Application Priority Data

Sep. 30, 1994 [KR] Rep. of Korea .............. 94-25076

[51] Int. Cl.$^6$ ........................................ G11B 7/00
[52] U.S. Cl. ............................. 369/44.41; 369/120
[58] Field of Search ..................... 369/47, 48, 54, 369/58, 44.41, 44.42, 44.23, 120

[56] References Cited

U.S. PATENT DOCUMENTS

| | | | |
|---|---|---|---|
| 5,144,006 | 9/1992 | Kadowaki | 369/44.41 |
| 5,287,338 | 2/1994 | Sato | 369/44.41 X |
| 5,315,574 | 5/1994 | Saimi et al. | 369/44.41 X |
| 5,473,586 | 12/1995 | Furuhata | 369/44.41 X |

OTHER PUBLICATIONS

"High density recording by superresolution in an optical disk memory system," Yamanaka, et al. *Applied Optics*, 29:20, 3046–3051, Jul. 10, 1990.

*Primary Examiner*—Muhammad N. Edun
*Attorney, Agent, or Firm*—Leydig, Voit & Mayer, Ltd.

[57] ABSTRACT

A method and apparatus for high-density reproduction of information recorded on an optical disk by increasing the optical resolution during reproduction. The apparatus focuses an optical beam reflected from the optical disk using a lens, and receives the focused reflected optical beam using a photodetector having an optical area whose width is smaller than the diameter of an optical spot formed thereon. As a result, jitter caused by interfering light, that is, light reflected from the circumference such as a recording portion adjacent to the optical disk, can be solved. Also, high-density reproduction can be performed by increasing the optical resolution during reproduction. The apparatus can be applied to an optical pickup for high-density recording.

8 Claims, 6 Drawing Sheets

METHOD AND APPARATUS FOR HIGH-DENSITY REPRODUCTION

BACKGROUND OF THE INVENTION

The present invention relates to a method and apparatus for reproducing information recorded on an optical disk in an optical disk drive, and more particularly, to a method and apparatus for an optical disk which can effectively reproduce high-density-recorded information by increasing an optical resolution during reproduction.

Generally, since information storage capacity of a recording medium, such as an optical disk, is proportionate to the recording density, methods for increasing the recording density of an optical disk have been studied continually.

The recording density is classified into the density for recording and for reproducing. The density for recording can be easily improved by increasing the amount of light. However, there is a practical limitation to the extent to which the recording density of an optical disk can be improved, since the density for reproducing is limited by only optical resolution research into high-resolution optical reproduction has been faced with difficult obstacles.

The use of a phase-shifting apodizer is for high-density recording of common knowledge. The phase-shifting apodizer is a diffracting element which transmits and diffracts an incident optical beam, and changes the distribution of an amplitude transmission rate of an optical opening so as to decrease energy of the diffracted optical beam in proportion to energy of the incident optical beam. Such a phase-shifting apodizer is disclosed in detail in the November '93 issue of *Journal of Japanese Applied Physics* (Vol. 32, pp.5269–5276).

FIG. 1 shows conventional optical pickup for high-density recording using the above described phase-shifting apodizer. Reference numeral 1 of FIG. 1 represent a laser diode as a light source. The optical beam generated from laser diode 1 is collimated by collimating lens 2. A part of the collimated light passes through a beam splitter 3 and an apodizer 4 in sequence. Thereafter, the optical beam is focused on an optical disk 6 by an objective 5. An optical beam reflected from optical disk 6 passes through objective 5 and apodizer 4. A part of the reflected optical beam is reflected from beam splitter 3 and is focused by a condensing lens 7 on a photodetector 8.

As shown in FIG. 2, a central portion 4a of the incident surface of apodizer 4 is in a shape of a slight convex.

The optical intensity distribution of the optical spot focused on optical disk 6 is changed by a phase-difference between central portion 4a and the remaining part around the convex central portion. Then, the diameter of the high intensity part of optical spot, which contributes to actual recording, reduces by as much as about 20–30%, thereby performing the high-density record of the optical disk.

However, substantial increases in high-density recording and reproduction are impossible due to the following problems generated during the reproduction of by the optical pickup. As shown in FIG. 3, the photodetector 8 has a detecting area 8a whose width is wider than the diameter of the optical spot. Since the width of the detecting area 8a of photodetector 8 is wider than the diameter of the optical spot 9 formed thereon in comparison with the narrow recording interval of optical disk. Accordingly, jitter is generated by waveform interference with an optical component reflected from the recording portion adjacent to the optical disk.

The above problem appears in nearly all optical high-density recording and reproduction systems. Therefore, a special treatment means has to be included to perform high-density reproduction without noise while using a conventional optical pickup.

SUMMARY OF THE INVENTION

It is an object of the present invention to provide a method and apparatus for high-density reproduction where on optical resolution of the reflected light is raised without special treatment of the optical pickup for thereby solving the jittering phenomenon.

To achieve the above object, the method, according to the present invention, for high-density reproduction includes: radiating an optical beam from a light source onto an optical recording medium; detecting an electrical signal from the optical beam reflected from the optical recording medium; the focusing the reflected optical beam using a lens to form an optical spot having a diameter; receiving the optical spot using a photodetector having a detecting area whose width is smaller than the diameter of the optical spot; and detecting the electrical signal from a part of the optical spot formed on the detecting area of the photodetector.

The apparatus, according to the present invention, for reproducing high-density information recorded on an optical recording medium comprises: a lens for focusing an optical beam reflected from an optical recording medium to form an optical spot having a diameter; and a photodetector having a detecting area whose width is smaller than the diameter of the optical spot formed thereon, for receiving the reflected optical beam, wherein the electrical signal is detected only from a portion of the optical spot formed on the detecting area.

The method for the high-density reproduction according to the present invention, when applied to the general optical pickup system, forms an optical spot of a larger diameter on the optical recording medium than using the above-described phase-shifting apodizer but by far improves the resolution of signal reproduction from the reflected optical beam. Thus, a signal can be reproduced without interference with the optical beam reflected from the adjacent portion of the optical recording medium. That is, the present invention performs practical high-density recording and reproduction providing a resolution equal to or superior to the case where the phase-shifting apodizer is used and special treatment means is added thereto. Thus, the present invention has practical applications.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
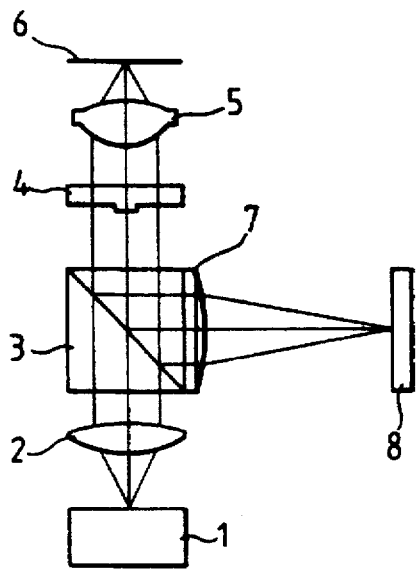
FIG. 1 shows an optical construction of the optical pickup for the high-density recording using the conventional phase-shifting apodizer.
Figure 2:
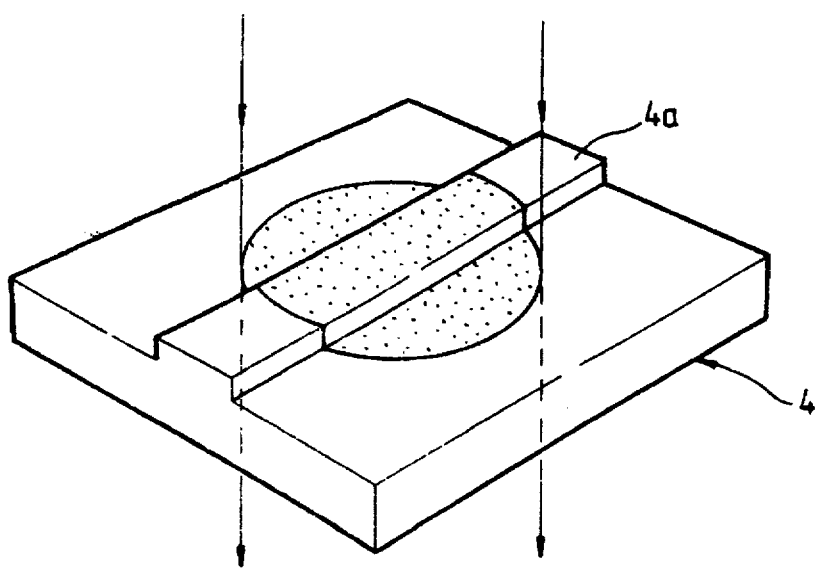
FIG. 2 is a perspective view of the phase-shifting apodizer shown in FIG. 1.
Figure 3:
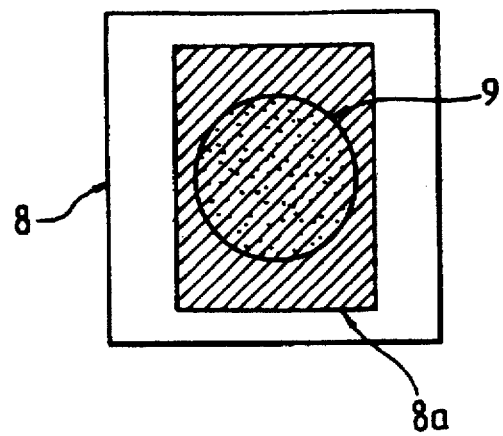
FIG. 3 is a plan view of the photodetector shown in FIG. 1.
Figure 4:
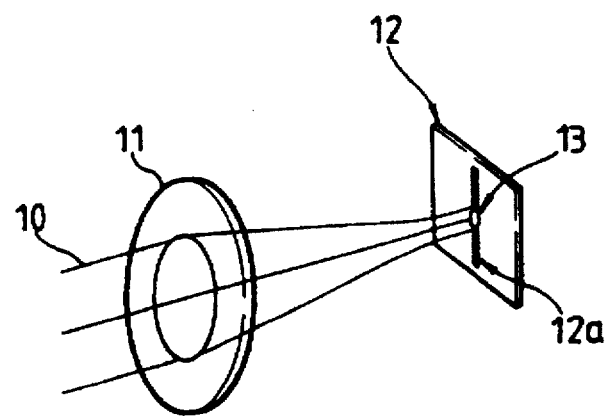
FIG. 4 is a perspective view showing an optical construction of an apparatus for the high-density reproduction according to the present invention.

FIG. 4 illustrates part of the general optical pickup optical system which can be applied to the optical pickup optical system for the high-density recording and reproduction as shown in FIG. 1.

In FIG. 4, reflected light 10 is radiated from a light source (not shown) and is reflected from an optical recording medium (not shown). A focusing lens 11 is set on a proceeding path of reflected optical beam 10 and a photodetector 12 is set near a focus point of focusing lens 11. Reflected optical beam 10 is focused by focusing lens 11 to form an optical spot on photodetector 12.

Figure 5:
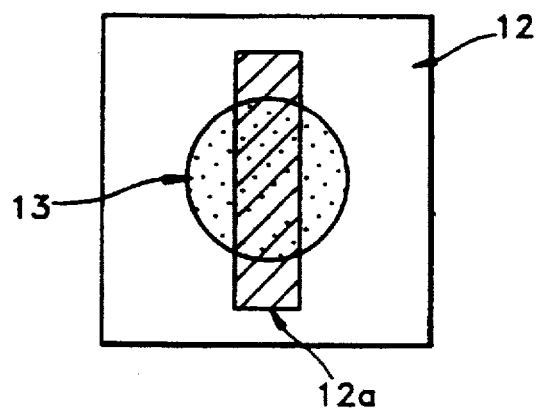
FIG. 5 is a plan view of the photodetector used in the method for the high-density reproduction of the present invention.

Referring to FIG. 5, photodetector 12 has a detecting area 12a whose width is smaller than the diameter of optical spot 13 formed thereon. Here, photodetector 12 is located on such that detecting area 12a can receive the central portion of optical spot 13.

Figure 6:
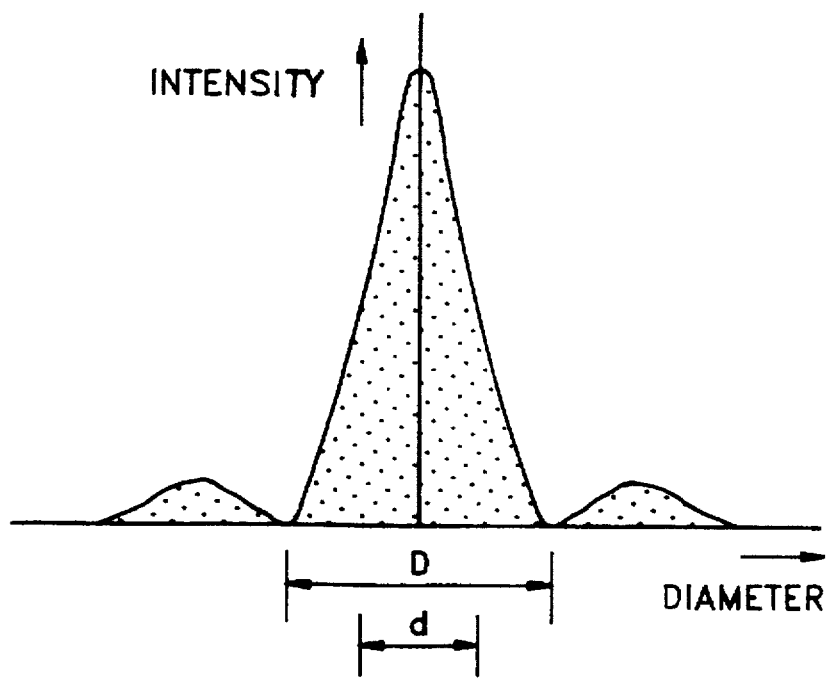
FIG. 6 is a profile showing the light intensity distribution of the optical spot formed on the photodetector in FIG. 5.

In order to explain an operational principle of the present invention, the increase of the modulation transfer function (MTF) representing the resolution according to the diffraction theory will be presented by way of formulas. The light intensity distribution of the optical spot formed on the detecting area of the above-described photodetector, as shown in FIG. 6, forms a distribution of the so-called Airy function. As well known, the Airy function represents the resolution of an interferometer. Here, reference characters d and D represent the width of the detecting area of the above-described photodetector and the diameter of central portion of optical spot formed on the photodetector, respectively. For example, if d is D/2, the MTF value H(ω) is as follows.

$$H(\omega) = \int_{-\infty}^{\infty} h(x')\exp(i\omega x')dx'$$

$$= \int_{-0}^{d} h(x')\cos(\omega x')dx'$$

$$\propto (2/\omega)\sin(\pi\omega/2ak)$$

where ω is spatial frequency, h(x') is Airy function, x' is the cross-sectional coordinate of optical intensity (refer to FIG. 4) (here, D=π/ak, i.e., the diameter of the Airy function).

Figure 7:
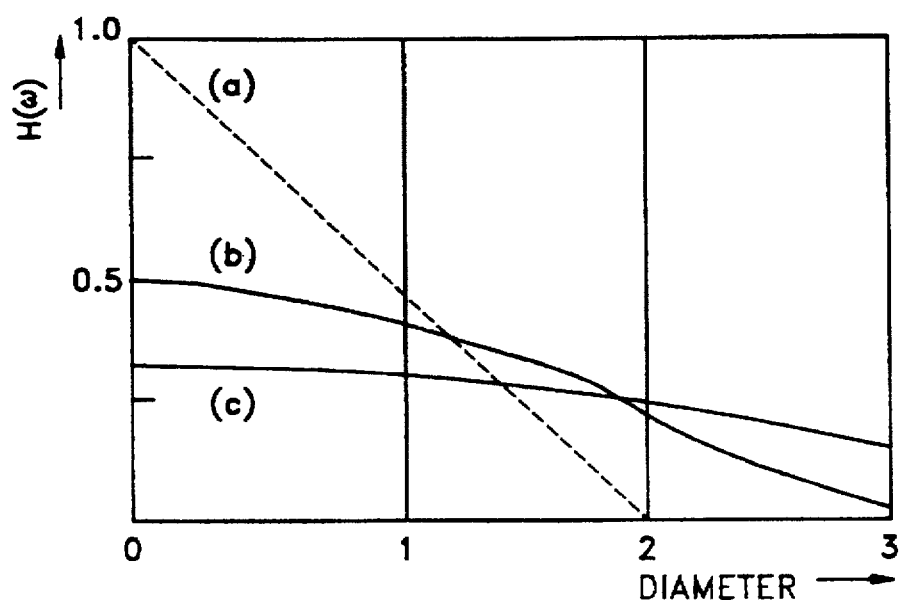
FIG. 7 is a graph showing a theoretical curve of an optical modulation transfer function.

FIG. 7 shows theoretical curves of the above MTF value. Here, a line (a) represents the case where width d of the above-described detecting area is equal to D/2, a line (b) represents the case where the conventional wider detecting area is used, and a line (c) represents the case where d is equal to D/3. From this theoretical curves, it is known that the resolution is increased at the region where the spatial frequency ω is high. Generally, the spatial frequency of the detecting signal used in the optical disk drive rapidly increases between ak and 2ak, and especially, near 2ak. Thus, the present invention provides high-density reproduction.

Figure 8:
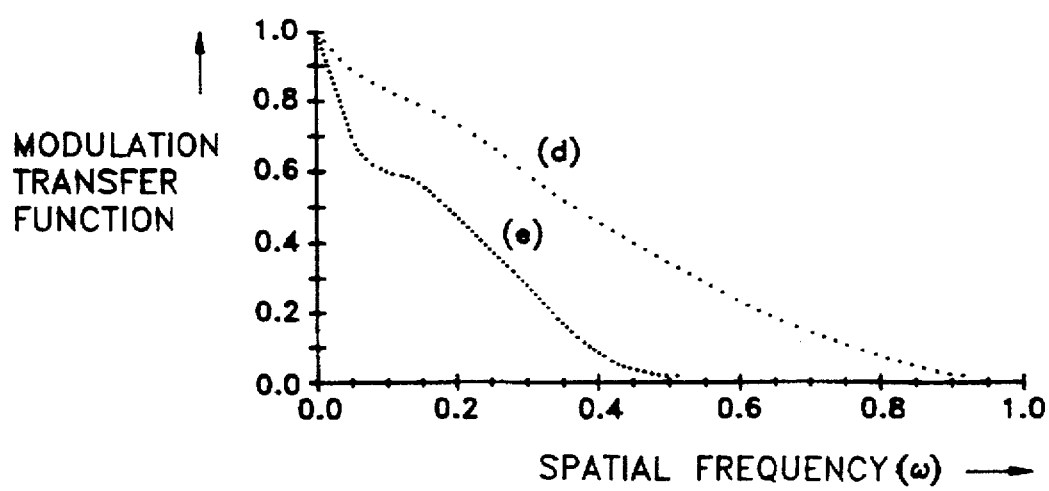
FIG. 8 is graph comparing the modulation transfer function of method for the high-density reproduction according to the present invention with that of the conventional art.

The measured MTF values which can properly represent the effect of the present invention are presented in FIG. 8. As shown in FIG. 8, the maximum spatial frequency shown as a plot (d), where the width of detecting area of the photodetector is equal to one half of the diameter of the optical spot focused thereon, is approximately twice that of a plot (e) of the conventional art.

Figure 9:
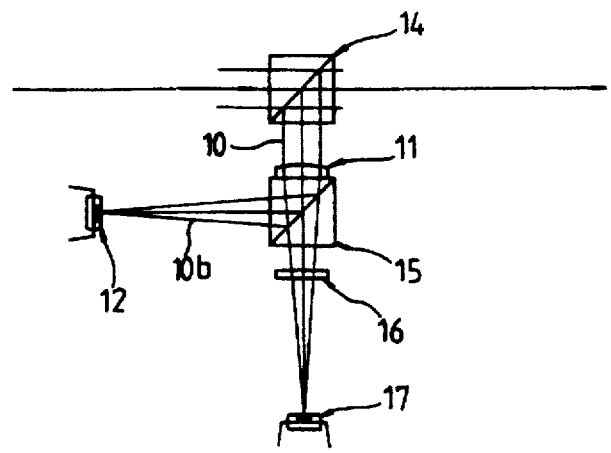
FIG. 9 shows an optical construction of the optical pickup including the apparatus for the high-density reproduction of a preferred embodiment according to the present invention.

FIG. 9, as a preferred embodiment according to the present invention, shows a structure where the optical detecting method is applied to the compact disk method for reproduction or to the optical intensity modulation method of phase-shifting. A first beam splitter 14 is set between an optical source and an optical disk (not shown in FIG. 9). A part of the optical beam travelling from the optical source to the optical disk passes through a first beam splitter 14 and a part of the optical beam reflected from the optical disk is reflected from the first beam splitter 14. After focusing by a condensing lens 11, a reflected optical beam 10 reflected from first beam splitter 14 is divided into two reflected optical beams 10a and 10b by a second beam splitter 15 disposed in front of condensing lens 11. One of the reflected optical beam 10a is incident on a photodetector 17 via a sensor lens 16. As a result, the focus and track control signals of the above-described objective are detected. The other reflected optical beam 10b perpendicular to the first reflected optical beam direction incident on photodetector 12 for reproduction according to the reproducing method of the present invention, as shown in FIG. 5.

Figure 10:
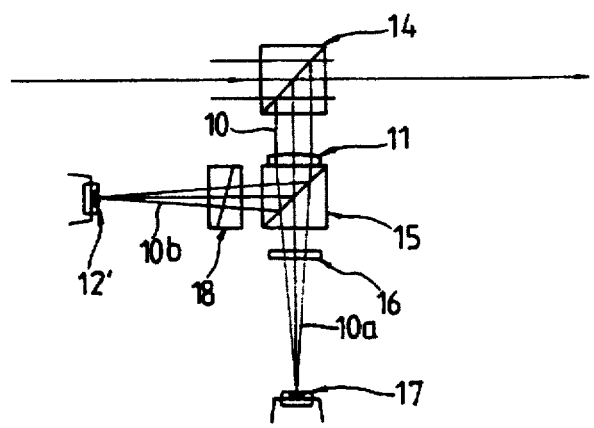
FIG. 10 shows an optical construction of the optical pickup including the apparatus for the high-density reproduction of another preferred embodiment according to the present invention.
Figure 11:
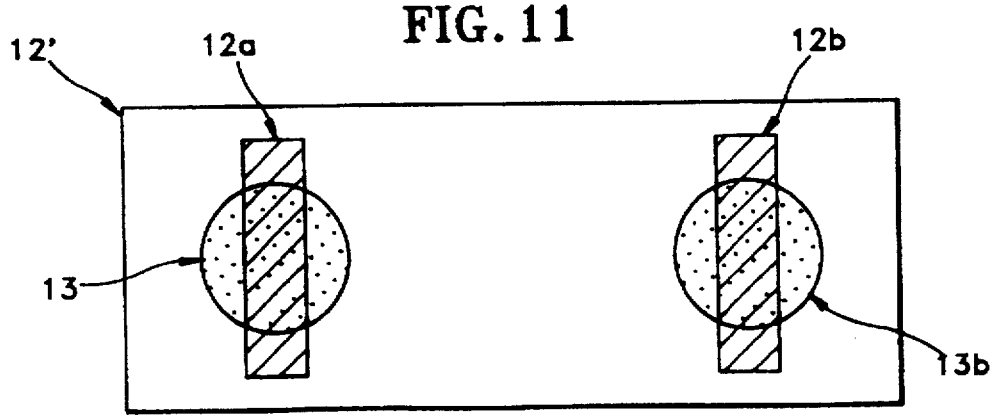
FIG. 11 is a plan view of the photodetector for the reproduction shown in FIG. 9.

FIG. 10 shows an optical construction of the optical pickup including the apparatus for high-density reproduction of another preferred embodiment according to the present invention. As shown in FIG. 10, Wollaston prism 18 is arranged in front of second beam splitter 15 described in the above preferred embodiment. Wollaston prism 18 separates two polarization components crossing at right angles from optical beam 10b reflected from second beam splitter 15. Photodetector 12' has two detecting areas 12'a and 12'b as shown in FIG. 11. Detecting areas 12'a and 12'b receives two optical spots 13a and 13b for two optical beam components polarization-divided by Wollaston prism 18. Detecting areas 12'a and 12'b have smaller widths than the diameters of optical spots 13a and 13b formed thereon, respectively. An optical magnetic signal which can reproduce the information recorded on an optical magnetic disk, can be produced by differentiating each signal detected from two detecting areas 12'a and 12'b.

Also, another optical elements which can divide P and S polarizations, such as A Rochan prism, a Nicol prism, or a Glan-Thompson prism, can be used instead of Wollaston prism 18.

Figure 12:
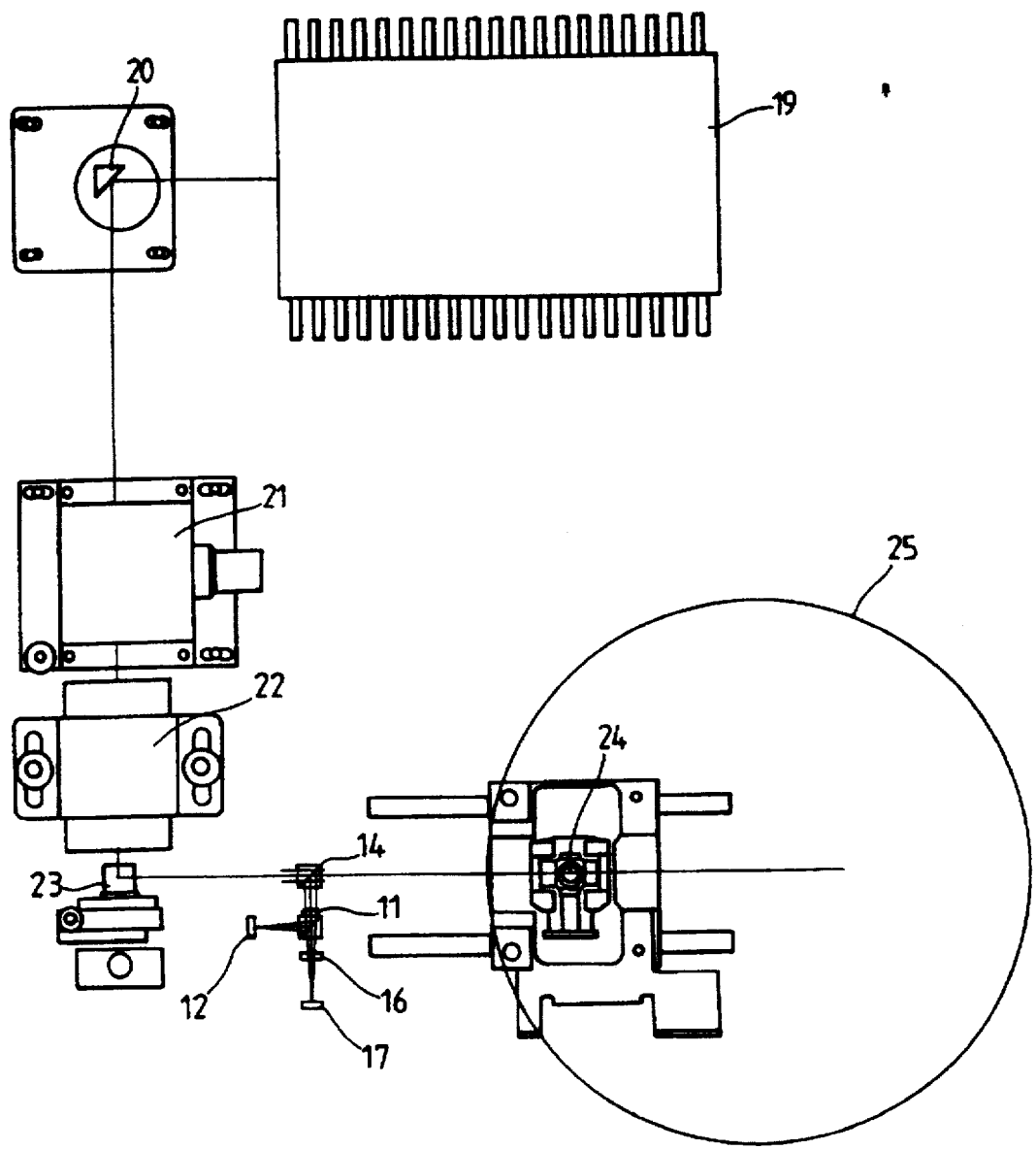
FIG. 12 is a plan view of an optical disk drive in which the reproducing method according to the present invention is applied to the optical pickup for the high-density recording and reproduction using a short-wavelength light source.

FIG. 12 shows an optical disk drive in which the reproducing method according to the present invention is applied to the optical pickup for high-density recording and reproduction using a short-wavelength light source. Light source 19 is the short-wavelength light source for generating the second harmonic wave. The light emitted from light source 19 is reflected from a reflecting mirror 20 and is modulated into a predetermined optical signal by an optical modulator 21. The modulated light passes through a first beam splitter 14 via a beam enlarger 22 and reflecting mirror 23 and is focused on optical disk 25 by objective 24 as a minute spot. Optical beam 10 is reflected from optical disk 25 and is again reflected through the first beam splitter 14 via objective 24, and is focused by and condensing lens 11, as described above. Thereafter the focused light is divided by second beam splitter 15, and received by photodetector 17 for detecting focus and track control signals and photodetector 12 for reproduction, respectively.

As described above, the present invention has a photodetector having a detecting area with a width which is smaller than the diameter of the reflecting light's spot formed thereon. Accordingly, optical resolution is increased and high-density reproduction of information of an optical recording medium is possible. The present invention can be applied without increasing costs and increases the real recording density by several times. As a result, the present invention can increase the practicality of the conventional optical system for high-density recording.

What is claimed is:

1. A method for reproducing high density information recorded on an optical recording medium comprising:

irradiating an optical recording medium with an optical beam from a light source;

focusing the optical beam reflected from the optical medium using a lens to format least one optical spot, each optical spot having a diameter;

detecting the center portion of the at least one optical spot using at least one photodetector, each photodetector having a detecting area with a width substantially equal to half the diameter of each of the optical spots; and generating an electrical signal from only the part of the optical spots overlying the respective detecting areas of the photodetectors.

2. The method of claim 1 comprising dividing the optical beam focused by the lens into two orthogonally polarized components using an optical dividing element to form two optical spots.

3. The method of claim 1 including detecting two optical spots using two photodetectors.

4. The method of claim 1 including detecting two optical spots using two photodetectors and including, in generating the electrical signal, differentiating electrical signals generated by the two photodetectors.

5. An apparatus for reproducing high-density information recorded on an optical recording medium comprising:

a lens for focusing an optical beam reflected from an optical recording media to format least one optical spot, each optical spot having a diameter; and at least one photodetector, each photodetector having a detecting area centrally disposed with respect to the optical spot and having a width substantially equal to half the diameter of a corresponding optical spot incident on the photodetector, for generating an electrical signal only in response to the part of the corresponding optical spot incident on the respective detecting area.

6. The apparatus of claim 5 including an optical dividing element for dividing the optical beam focused by the lens into two orthogonally polarized components to form two optical spots.

7. The apparatus of claim 5 comprising two photodetectors.

8. The apparatus of claim 5 wherein the lens has a focal length and the photodetector is located in a focal plane, one focal length from the lens.

* * * * *